US012068660B2

(12) United States Patent
Huard et al.

(10) Patent No.: US 12,068,660 B2
(45) Date of Patent: Aug. 20, 2024

(54) ELECTRIC MOTOR

(71) Applicant: Parker-Hannifin Corporation, Cleveland, OH (US)

(72) Inventors: Steven R. Huard, New Ulm, MN (US); Travis J. Anderson, Winthrop, MN (US); Kevin B. Henke, Hutchinson, MN (US); Joseph L. Dobmeier, Mankato, MN (US); John P. Blomberg, New Ulm, MN (US); Justin O. Byers, Madelia, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 356 days.

(21) Appl. No.: 17/435,553

(22) PCT Filed: Apr. 17, 2020

(86) PCT No.: PCT/US2020/028629
§ 371 (c)(1),
(2) Date: Sep. 1, 2021

(87) PCT Pub. No.: WO2020/214884
PCT Pub. Date: Oct. 22, 2020

(65) Prior Publication Data
US 2022/0069668 A1 Mar. 3, 2022

Related U.S. Application Data

(60) Provisional application No. 62/835,686, filed on Apr. 18, 2019, provisional application No. 62/935,879, filed on Nov. 15, 2019.

(51) Int. Cl.
*H02K 7/10* (2006.01)
*H02K 1/02* (2006.01)
(Continued)

(52) U.S. Cl.
CPC ............. *H02K 7/1023* (2013.01); *H02K 1/02* (2013.01); *H02K 1/16* (2013.01); *H02K 5/16* (2013.01);
(Continued)

(58) Field of Classification Search
CPC .......... H02K 21/00; H02K 21/14; H02K 7/00; H02K 7/10; H02K 7/11; H02K 1/00;
(Continued)

(56) References Cited

U.S. PATENT DOCUMENTS 5,107,156 A * 4/1992 Jaun .................. H02K 21/14
310/266
5,796,192 A 8/1998 Riepl
(Continued)

FOREIGN PATENT DOCUMENTS

CN 101693441 A 4/2010
CN 201594774 U 9/2010
(Continued)

OTHER PUBLICATIONS

Notice of Reasons for Refusal issued by the Japanese Patent Office in for Japanese Patent Application No. 2021-557400, dated May 23, 2023. (English translation included).
(Continued)

*Primary Examiner* — Tran N Nguyen
(74) *Attorney, Agent, or Firm* — McDonnell Boehnen Hulbert & Berghoff LLP

(57) ABSTRACT

An example electric motor includes a housing, a stator fixed relative to the housing, a rotor, a brake assembly, a first bearing, and a second bearing. The rotor has a hub portion, a cylindrical portion, and a disk portion. The hub portion of the rotor has a first end, a second end, and a through hole therethrough. The brake assembly is fixed relative to the housing and configured to selectively couple the disk portion (Continued)

of the rotor to the housing. The first bearing is mounted between the first end of the hub portion of the rotor and the disk portion of the rotor. The second bearing is mounted between the second end of the hub portion of the rotor and the disk portion of the rotor.

18 Claims, 12 Drawing Sheets

(51) Int. Cl.
    *H02K 1/16*     (2006.01)
    *H02K 5/16*     (2006.01)
    *H02K 7/102*     (2006.01)
    *H02K 21/14*     (2006.01)
    *H02K 1/27*     (2022.01)
    *H02P 3/04*     (2006.01)

(52) U.S. Cl.
    CPC ............... *H02K 21/14* (2013.01); *H02K 1/27* (2013.01); *H02P 3/04* (2013.01)

(58) Field of Classification Search
    CPC .. H02K 1/02; H02K 1/16; H02K 5/00; H02K 5/02; H02K 5/16; H02K 5/22; H02K 11/00; H02K 11/22; B60B 7/00; B60B 35/00; B60B 35/14
    See application file for complete search history.

(56) References Cited

U.S. PATENT DOCUMENTS

| | | | |
|---|---|---|---|
| 5,982,063 | A | 11/1999 | Lutz et al. |
| 9,866,157 | B2 | 1/2018 | Gopalakrishnan et al. |
| 2005/0106046 | A1* | 5/2005 | Winkler ............. F04D 25/0646 417/423.3 |

FOREIGN PATENT DOCUMENTS

| | | |
|---|---|---|
| CN | 102951010 A | 3/2013 |
| CN | 108574371 A | 9/2018 |
| DE | 3922794 A1 | 1/1990 |
| DE | 9414054 U1 | 11/1994 |
| DE | 29803665 U1 | 5/1998 |
| EP | 1040561 B1 | 2/2007 |
| EP | 1870985 B1 | 6/2010 |
| GB | 1294465 A | 10/1972 |
| JP | 51-108201 | 9/1976 |
| JP | S57114208 A | 7/1982 |
| JP | 58-031444 | 3/1983 |
| JP | H06-62231 U | 9/1984 |
| JP | H03-78144 | 8/1991 |
| JP | 2004-328898 A | 11/2004 |
| JP | 2015-083440 A | 4/2015 |
| JP | 2017-163628 A | 9/2017 |
| JP | 2019-018274 A | 2/2019 |
| WO | 9013168 A1 | 11/1990 |
| WO | 9931792 A1 | 6/1999 |
| WO | 2011/003718 A2 | 1/2011 |
| WO | 2017/203570 A1 | 11/2017 |

OTHER PUBLICATIONS

Communication Pursuant to Article 94(3) EPC issued by the European Patent Office in application No. 20 725 277.6 dated Jun. 19, 2023.
International Search Report received for PCT Patent Application No. PCT/US2020/28629, mailed on Jul. 6, 2020, 6 pages.
Written Opinion received for PCT Patent Application No. PCT/US2020/28629, mailed on Jul. 6, 2020, 8 pages.
Servo motor brake operation—How it Works, May 23, 2019, 4 pages, https://kebblog.com/how-it-works-servo-motor-brakes/.
Notice of Preliminary Rejection issued by the Korean Patent Office in for Korean Patent Application No. 10-2021-7032703, dated Apr. 19, 2023. (English translation included).
Examiner's Requisition Report for Canadian Patent Application No. 3,134,176 mailed Nov. 4, 2022.
Notice of the Reason for Refusal for Japanese Patent Application No. 2021-557400 mailed Oct. 25, 2022.
Examiner's Requisition Report for Canadian Patent Application No. 3,134,176 dated Jul. 17, 2023.
First Office action issued by the Chinese Patent Office in Application No. 202080026262.9 dated Dec. 14, 2023. (English translation included).
Search Report for India Patent Application No. 202117043900, mailed May 12, 2022.

* cited by examiner

ELECTRIC MOTOR

REFERENCE TO RELATED APPLICATIONS

This application claims priority to U.S. Patent Application No. 62/835,686 filed on Apr. 18, 2019 and to U.S. Patent Application No. 62/935,879 filed on Nov. 15, 2019, the entirety of each of which is hereby incorporated by reference.

FIELD

The present disclosure relates generally to electric motors, and more particularly, to brushless electric motors with integrated brakes.

BACKGROUND

Many applications that utilize electric motors also utilize brakes. Hence, there are a multitude of inventions combining these two technologies. Designers of electric motors consider package size limitations, torque requirements, holding and slowing/stopping requirements, and other requirements when designing electric motors.

SUMMARY

In one example, an electric motor is described. The electric motor includes a housing, a stator fixed relative to the housing, a rotor, a brake assembly, a first bearing, and a second bearing. The rotor has a hub portion, a cylindrical portion, and a disk portion. The hub portion of the rotor has a first end, a second end, and a through hole therethrough. The brake assembly is fixed relative to the housing and configured to selectively couple the disk portion of the rotor to the housing. The first bearing is mounted between the first end of the hub portion of the rotor and the disk portion of the rotor. The second bearing is mounted between the second end of the hub portion of the rotor and the disk portion of the rotor.

In another example, an electric motor is described. The electric motor includes a housing, a stator fixed relative to the housing, a rotor, a brake assembly, a first bearing, and a second bearing. The rotor has a hub portion, a cylindrical portion, and a disk portion. The hub portion of the rotor has a first end, a second end, and a through hole therethrough. The brake assembly is fixed relative to the housing and has a cylindrical portion. In addition, the brake assembly is configured to selectively couple the disk portion of the rotor to the housing. The first bearing is mounted between the second end of the hub portion of the rotor and the disk portion of the rotor. The second bearing is mounted between the second end of the hub portion of the rotor and the disk portion of the rotor. The first bearing and the second bearing each have an outer diameter that is greater than an inner diameter of the cylindrical portion of the brake assembly. Also, the first bearing and the second bearing each have an inner diameter that is less than the inner diameter of the cylindrical portion of the brake assembly.

In another example, an electric motor is described. The electric motor includes a housing, a stator fixed relative to the housing, a rotor, and a brake assembly. The rotor has a hub portion, a cylindrical portion, and a disk portion. The hub portion of the rotor has a first end, a second end, and a through hole therethrough. The brake assembly is fixed relative to the housing and is configured to selectively couple the disk portion of the rotor to the housing. In addition, the brake assembly includes a brake housing. The brake housing has a base, a first cylindrical portion extending axially from the base, and a second cylindrical portion extending axially from the base. The second cylindrical portion of the brake housing is concentrically positioned within the first cylindrical portion of the brake housing. An axial end of the first cylindrical portion is axially offset from and parallel to an axial end of the second cylindrical portion.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

DETAILED DESCRIPTION

Figure 1:
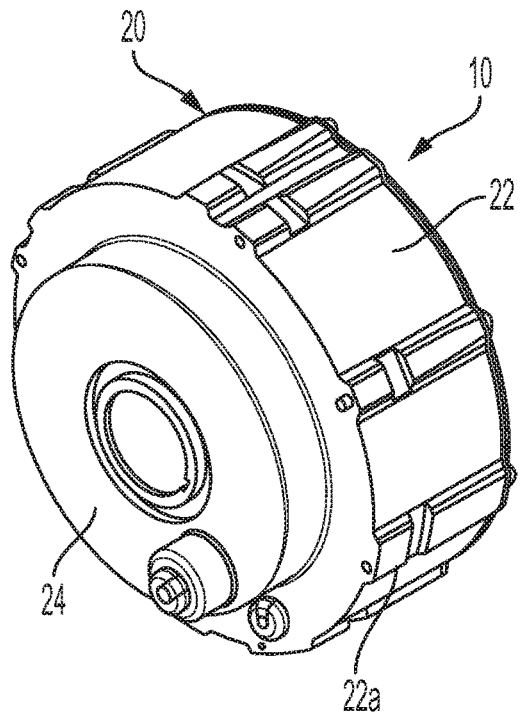
FIG. 1 is a front perspective view of an electric motor, according to an example embodiment.
Figure 2:
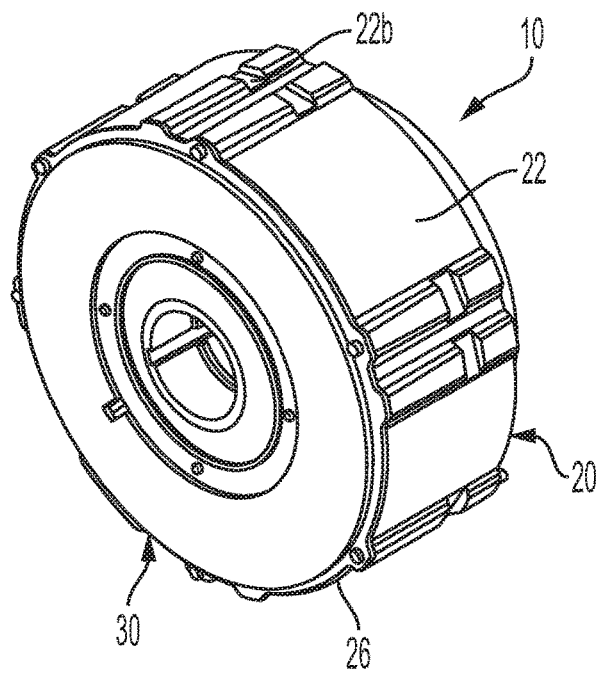
FIG. 2 is a rear perspective view of the electric motor of FIG. 1.
Figure 3:
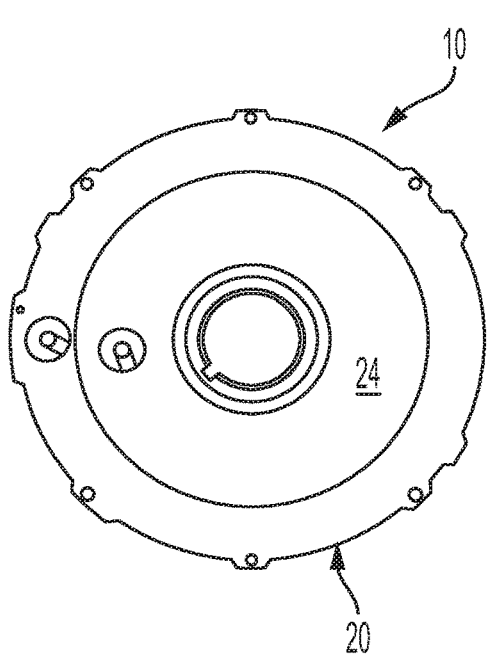
FIG. 3 is a front elevation view of the electric motor of FIG. 1.
Figure 4:
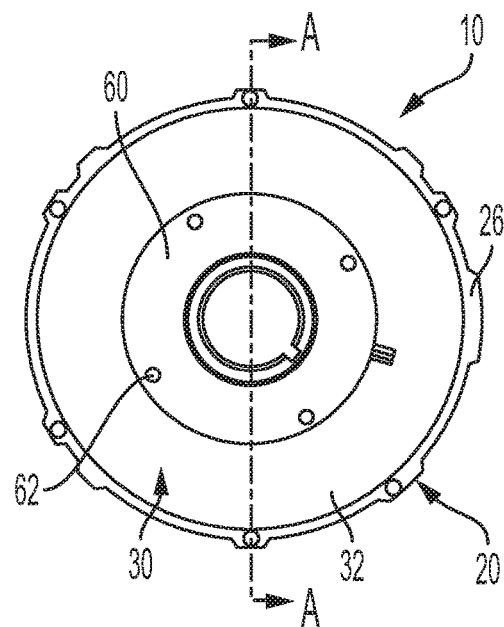
FIG. 4 is a rear elevation view of the electric motor of FIG. 1.
Figure 5:
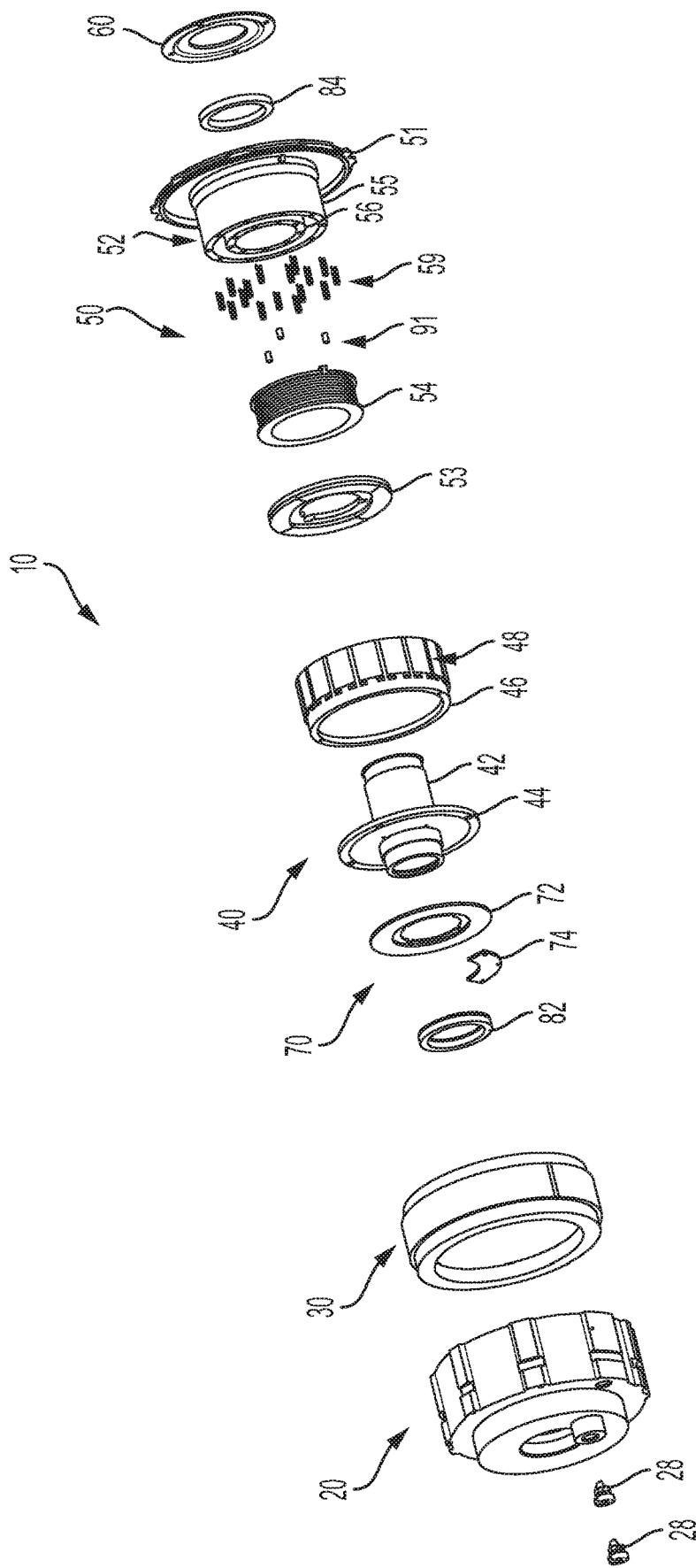
FIG. 5 is an exploded view of the electric motor of FIG. 1.

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

In conventional systems that use an electric motor to drive a shaft and also include a brake assembly, the electric motor is coupled to the drive shaft at a first position and a brake assembly that is external to the electric motor is coupled to the drive shaft at a second position. In some instances, it may be desirable to provide an electric motor with an integrated brake together within a common housing.

Accordingly, described herein are electric motors having integrated brakes. An example electric motor includes a housing, a stator, a rotor, and a brake assembly. The rotor has a hub portion, a cylindrical portion, and a disk portion. The hub portion of the rotor has a first end, a second end, and a through hole therethrough. The brake assembly is fixed relative to the housing and configured to selectively couple the disk portion of the rotor to the housing.

Advantageously, the brake assembly is provided inside of the housing of the electric motor along with the stator and rotor. For instance, the brake assembly can include a brake plate and other components that fit within the cylindrical portion of the rotor. Integrating the brake into the housing of the electric motor in this manner can eliminate the need to couple a separate brake to a shaft that is driven by the electric motor.

Various features of the electric motors are hereinafter with reference to the accompanying figures.

Referring now to FIGS. 1-6, an electric motor 10 is provided having a housing 20, a stator 30, a rotor 40, a brake assembly 50, a bearing cover 60, a feedback system 70, a first bearing 82, and a second bearing 84. Housing 20 includes a generally cylindrical portion 22, a closed first end 24, and an open second end 26. Cylindrical portion 22 includes protruding ribs 22a and grooves 22b that allow for securing housing 20 within a fixture during assembly of electric motor. Housing 20 also includes strain relief plugs 28.

Stator 30 is fixedly attached to the interior of cylindrical portion 22. Rotor 40 is positioned concentrically within stator 30 and separated therefrom by a gap. Rotor 40 includes a hub portion 42, a disk portion 44, and a cylindrical portion 46. Hub portion 42 has a first end 42a, a second end 42b, and a through hole 42c therethrough. Through hole 42c may be utilized to support a shaft, such as an axle of a robot. Cylindrical portion 46 can be made of a magnetic material and includes a plurality of magnets 48 mounted circumferentially thereabout. Disk portion 44 extends radially between hub portion 42 and cylindrical portion 46. Hub portion 42 and disk portion 44 may be made of a non-magnetic material.

Brake assembly 50 is fixedly attached to open second end 26 of housing 20 and includes a base 51, a brake housing 52, a brake plate 53, and an electromagnetic brake release 54. Base 51 combines with housing 20 to house electric motor 10. Brake housing 52 is concentrically positioned within cylindrical portion 46 of rotor 40 and separated therefrom by a gap. Brake housing 52 includes a first cylindrical portion 55 and a second cylindrical portion 56. First cylindrical portion 55 extends axially from base 51 to an axial end 55a. Second cylindrical portion 56 extends axially from base 51 to an axial end 56a. Second cylindrical portion 56 is positioned concentrically within first cylindrical portion 55 and separated therefrom by a slot 57. Base 51 and brake housing 52 are shown as a combined part. In other examples, base 51 and brake housing 52 could be separate parts that can be fixedly attached to each other.

Bearing cover 60 is attached to base 51 of brake assembly 50 by way of fasteners 62. Use of bearing cover 60 allows second bearing 84 to be installed from the outside of electric motor 10.

Feedback system 70 includes a target 72 and a reader head 74. In one example, target 72 can be an encoder disc that is attached to rotor 40. The encoder disc can have a pattern that can be read by reader head 74 and used to determine an angular position of target 72 and, therefore, an angular position of a shaft to which rotor 40 is coupled.

Figure 7:
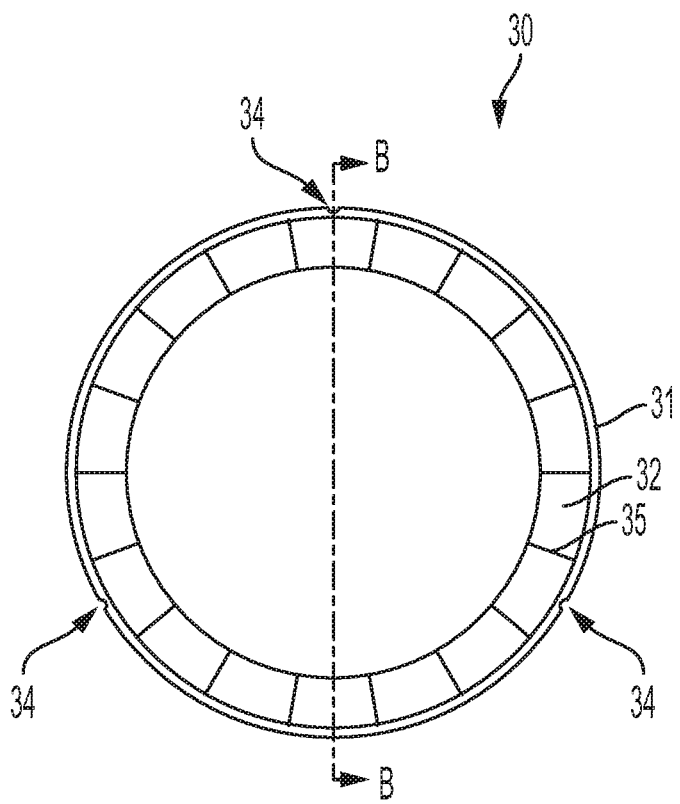
FIG. 7 is an elevation view of a stator, according to an example embodiment.
Figure 8:
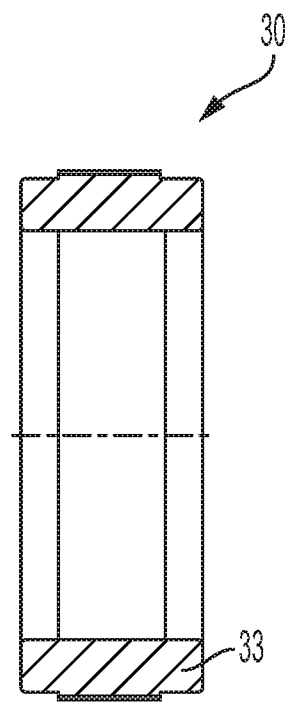
FIG. 8 is a cross-sectional view of the stator of FIG. 7, shown along line B-B.
Figure 9:
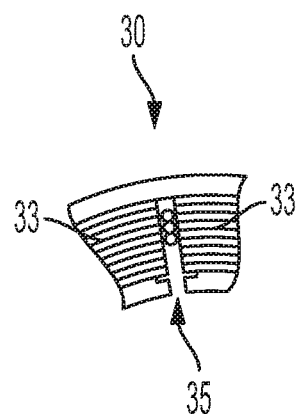
FIG. 9 is a partial view of the stator of FIG. 7.

As shown in FIGS. 7-9, stator 30 can include a lamination stack 31 with slots 32 that are designed to retain stator wires 33. Stator wires 33 can be can be energized by a motor controller. Lamination stack 31 can include a stack of steel plates. The steel plates can be coated with an insulator that is used to prevent the voltage applied to stator wires 33 from shorting to the stack of laminated steel plates.

Further, stator 30 includes notches 34 that can be used for aligning stator 30 with housing 20. For instance, a set screw 90 can be positioned through cylindrical portion 22 of housing 20 and engage one of the notches 34.

Figure 10:
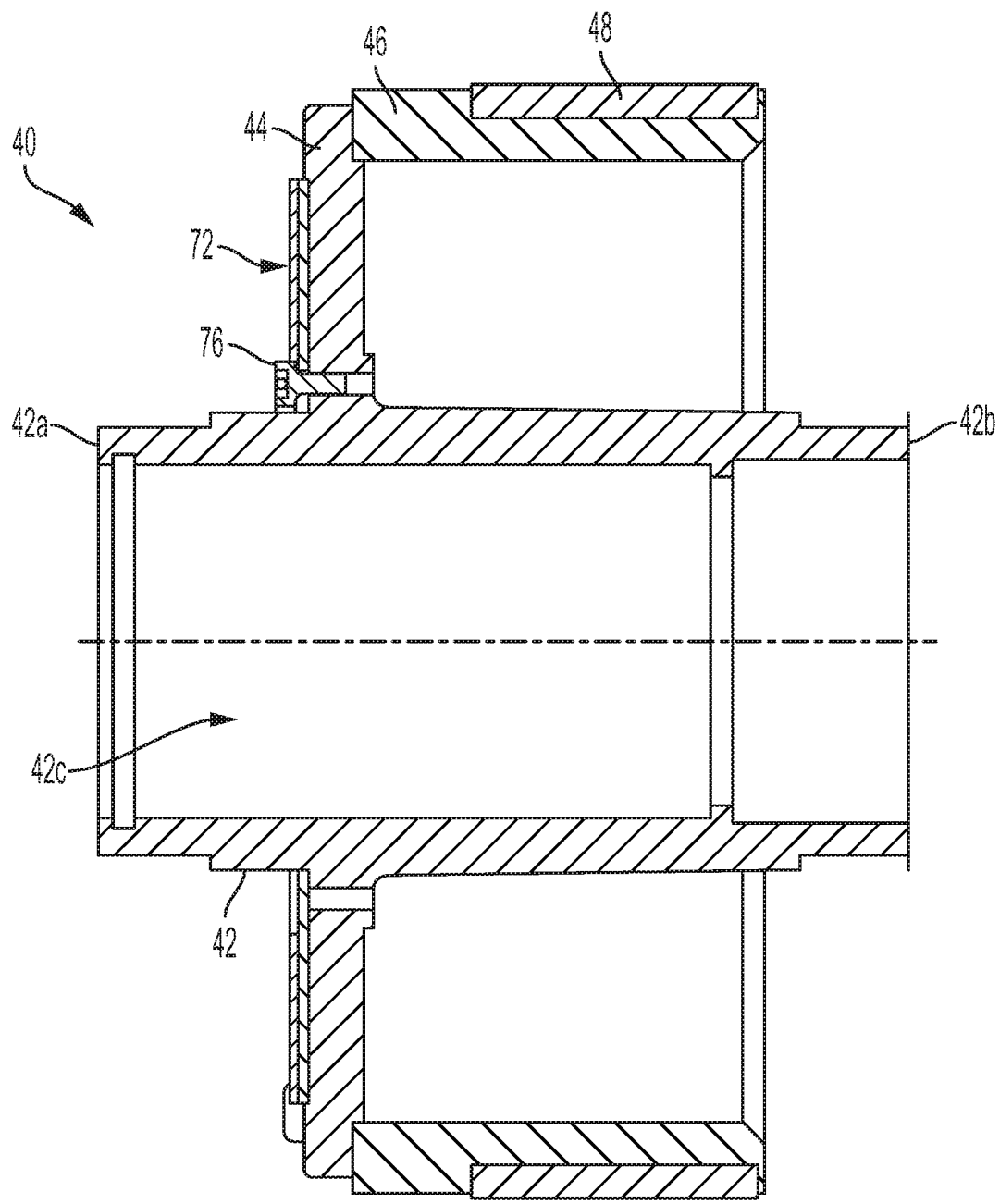
FIG. 10 is a cross-sectional view of a rotor, according to an example embodiment.
Figure 11:
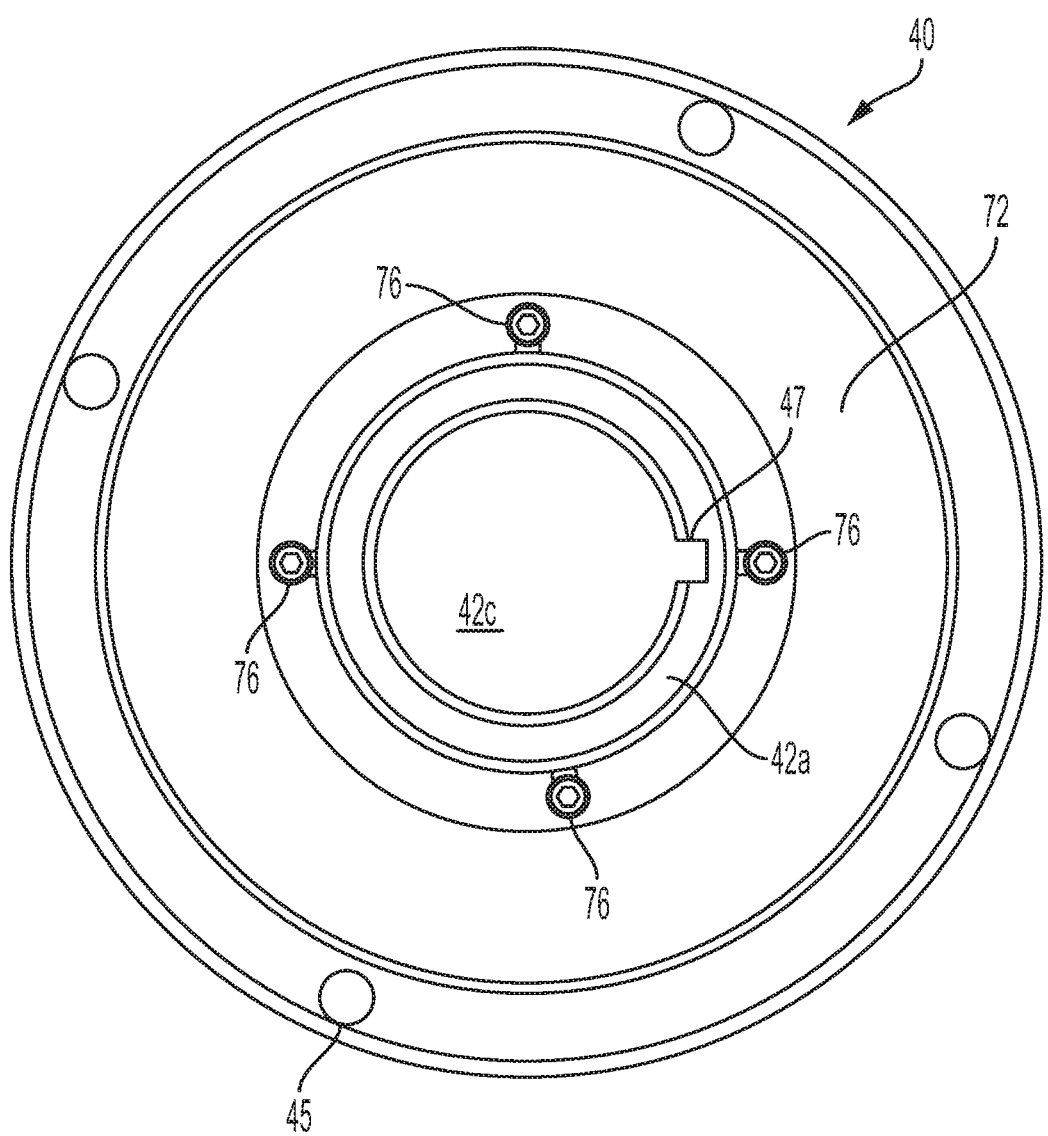
FIG. 11 is an elevation view of the rotor of FIG. 10.

As shown in FIG. 10, target 72 of feedback system 70 can be mounted to disk portion 44 of rotor by a plurality of fasteners 76. Further, as shown in FIG. 11, Plurality of fasteners 76 can be arranged in an asymmetric pattern such that target 72 can be installed in only one orientation relative to plurality of magnets 48 of rotor. This feature can ensure proper commutation of electric motor 10 by a motor controller (not shown) and can be utilized in aligning a through shaft keyway 47 of rotor 40 with absolute position information provided on target 72.

As further shown in FIG. 11, cylindrical portion 46 of rotor 40 includes mounting holes 45 that can be aligned with north pole magnets of cylindrical portion 46. This feature can assure that disk portion 44 of rotor 40 turns in a correct direction when energized by the motor controller.

In some examples, part of the surface of disk portion 44 of rotor 40 that is configured to be engaged by a brake lining of brake assembly 50 can include a surface finish that enhances the static coefficient of friction of the part of the surface. This can allow electric motor 10 to withstand more force without rotor 40 moving as well as maximize the stopping ability of brake assembly 50.

Figure 12:
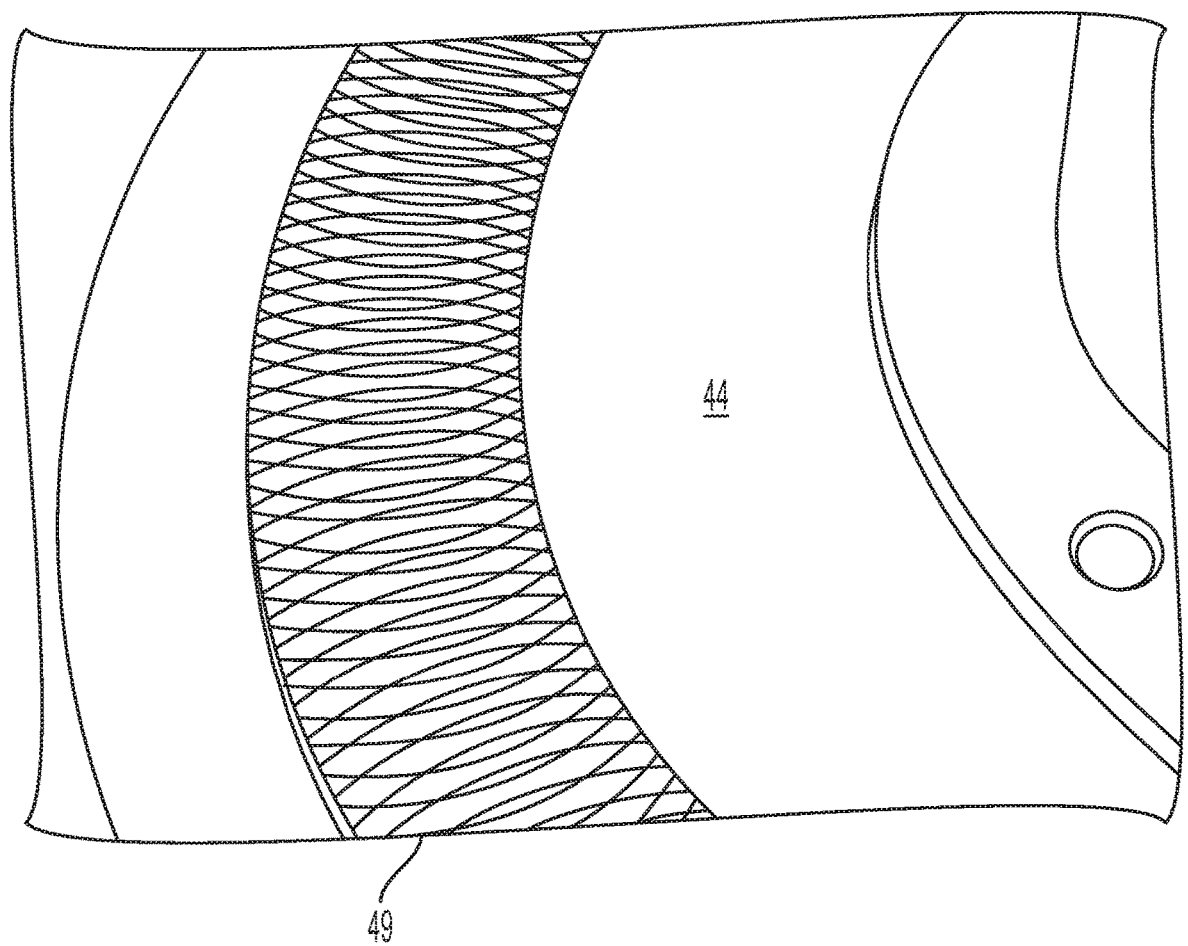
FIG. 12 is a partial view of the rotor of FIG. 10.

By way of example, FIG. 12 illustrates that part of the surface of disk portion 44 includes a surface finish 49. Surface finish 49 is shown as a knurled pattern that is cut into the surface of disk portion 44. The knurled pattern includes overlapping curved lines that are cut into the surface of disk portion 44. In an example implementation, the curved lines can have a depth of a few thousandths of an inch, such as between one thousandth and five thousandths of an inch. Further, each curved line can be an arc of a circle, such as an arc of a circle having a radius of between one and two inches. The edges of knurled pattern may have a slightly higher gripping force if used with a brake pad material with some compliance. Advantageously, the knurled pattern shown in FIG. 12 is easy to make (e.g., using an end mill) and provides extra friction for braking. Surface finish 49 can take other forms as well.

Figure 6:
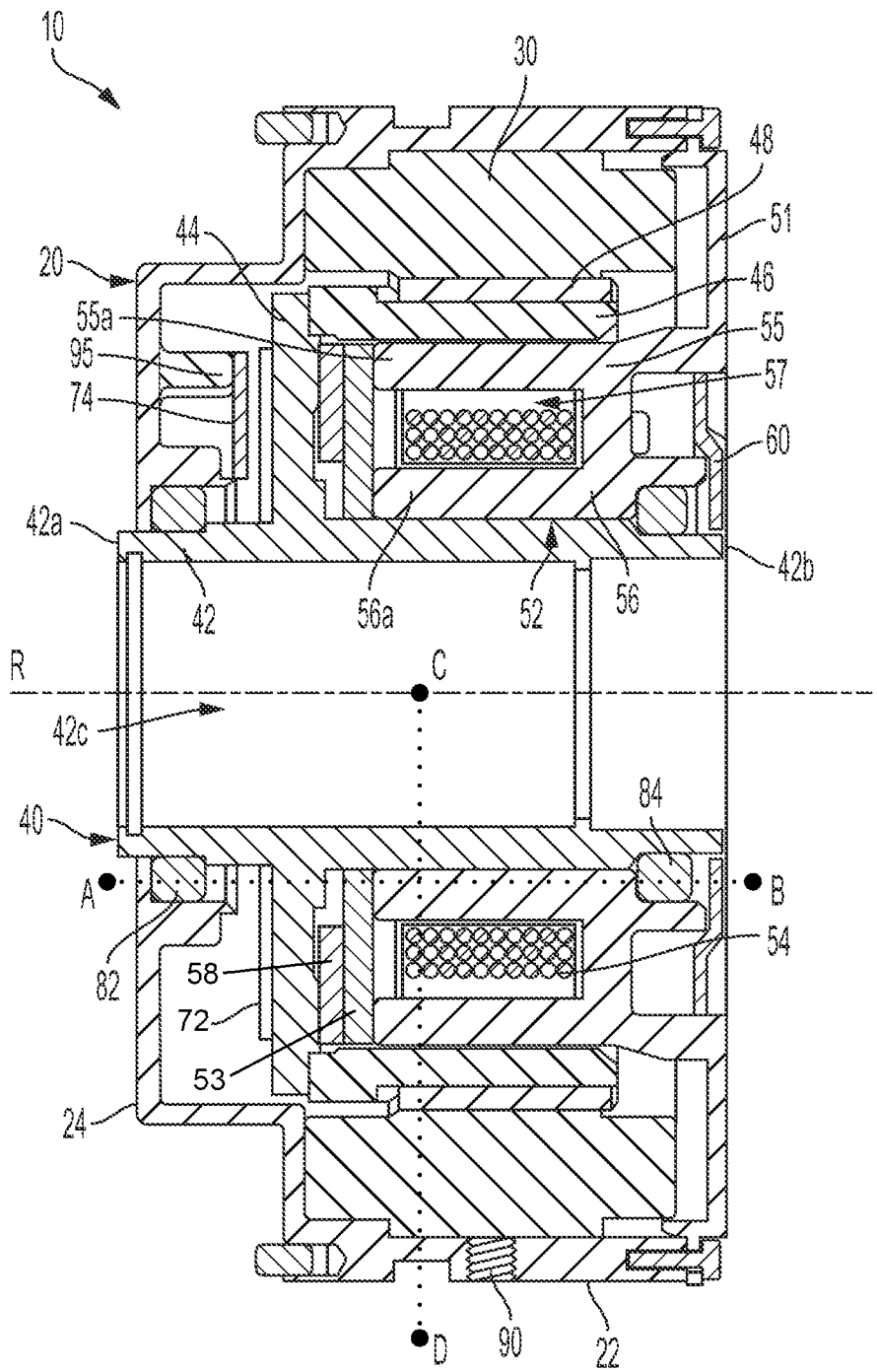
FIG. 6 is a cross-sectional view of the electric motor of FIG. 4, shown along line A-A.
Figure 13:
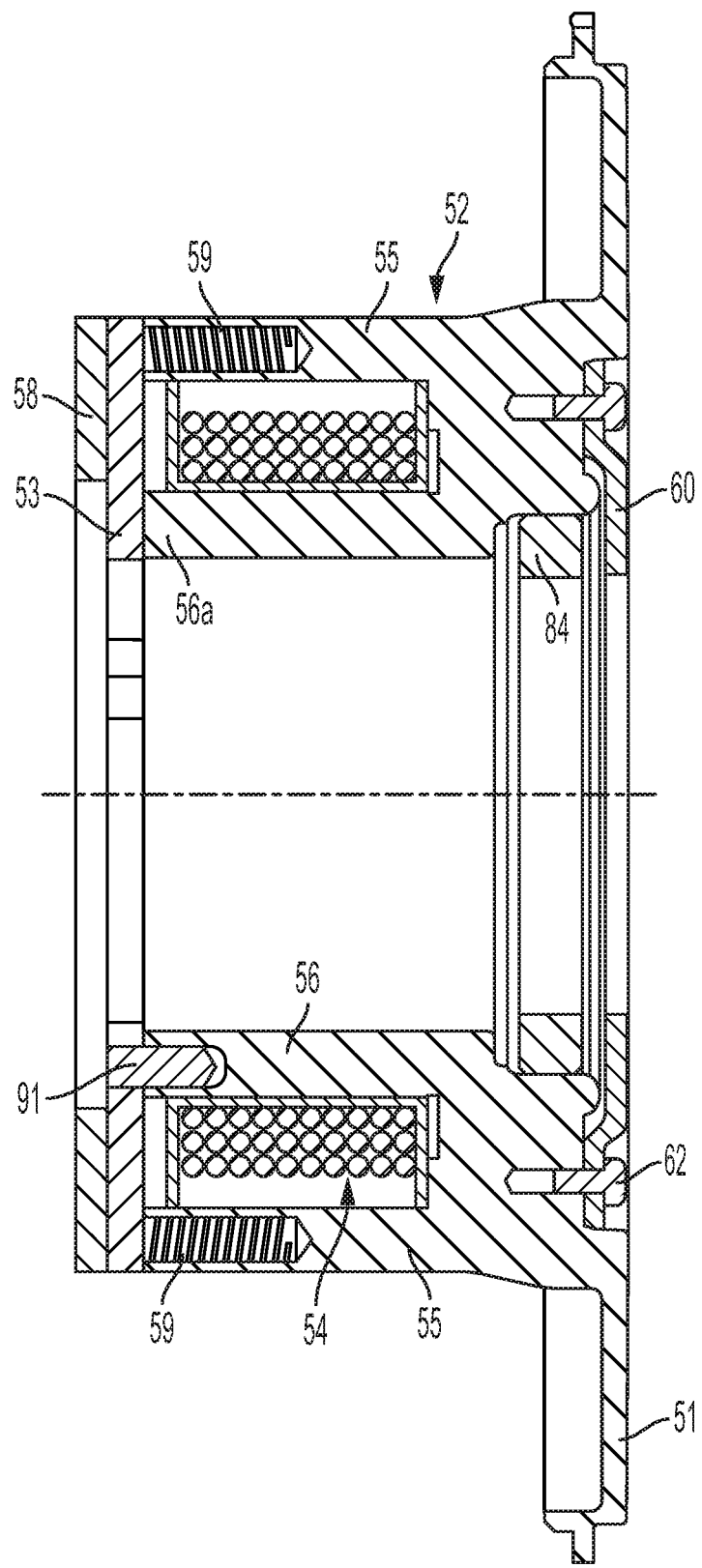
FIG. 13 is a partial cross-sectional view of the electric motor of FIG. 4, shown along line A-A.
Figure 14:
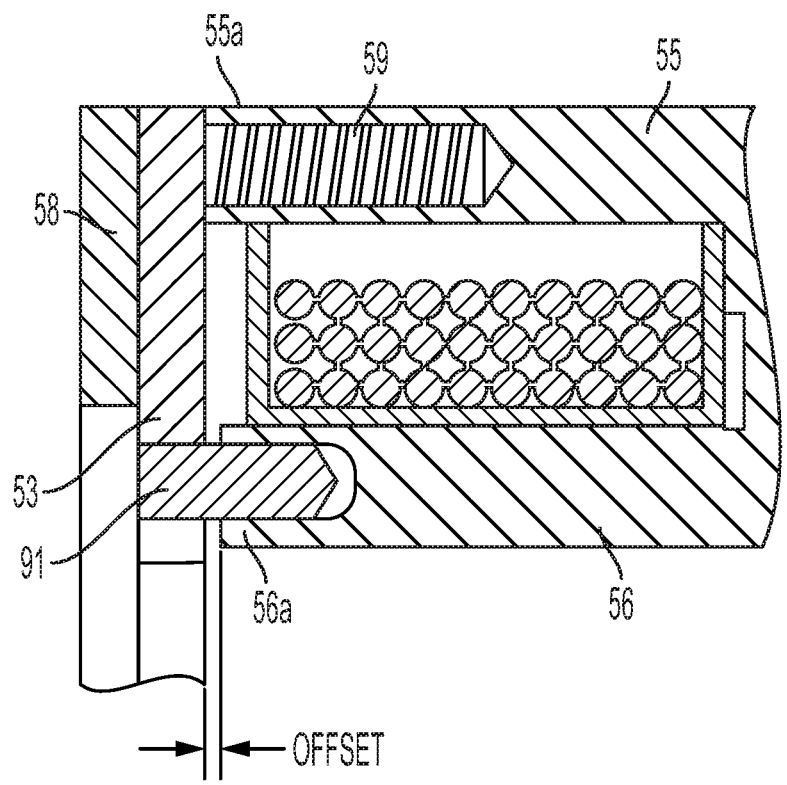
FIG. 14 is a detail view of a portion of FIG. 13.
Figure 15:
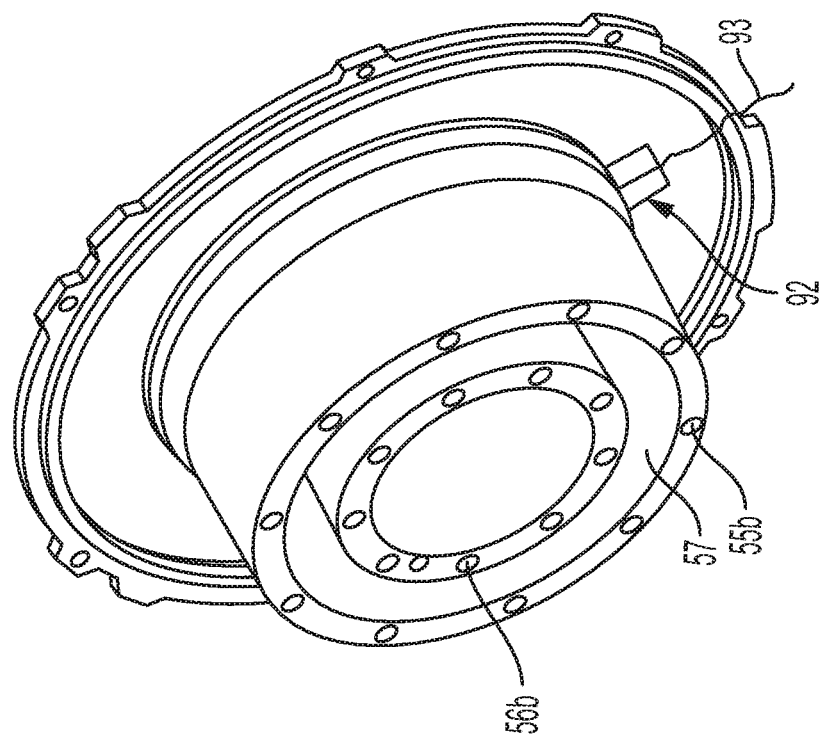
FIG. 15 is a perspective view of a brake assembly, according to an example embodiment.

As shown in FIG. 6, and more clearly in FIGS. 13 and 14, brake plate 53 is positioned on and covers at least a portion of axial ends 55a, 56a of first cylindrical portion 55 and second cylindrical portion 56. Brake plate 53 includes a brake lining portion 58 which is biased against disk portion 44 of rotor 40 by springs 59 to prevent rotation of rotor 40 in a first operating condition. Springs 59 may be housed in recesses 55b in first cylindrical portion 55 and/or recesses 56*b* in second cylindrical portion 56. Recesses 55*b* and recesses 56*b* are shown in FIG. 15.

Further, electromagnetic brake release 54, shown in FIGS. 6, 13, and 14 as an electromagnetic coil, can retract brake plate 53 such that a gap exists between brake lining portion 58 and disk portion 44 of rotor 40, thereby allowing rotation of rotor 40 in a second operating condition. For instance, a motor controller may send a current to electromagnetic brake release 54, which causes brake plate 53 to retract. Pins 91 may be utilized with brake plate 53 and recesses 56*b* in second cylindrical portion 56 to prevent rotation of brake plate 53 with respect to brake housing 52. Recesses 56*b* are shown in FIG. 15.

As further shown in FIG. 14, in some examples, axial end 55*a* of first cylindrical portion 55 is axially offset from axial end 56*a* of second cylindrical portion 56 such that the axial ends 55*a*, 56*a* are parallel but not in plane with one another. With this configuration, brake plate 53 only rests flat upon one of axial ends 55*a*, 56*a*. As shown in FIG. 14, brake plate 53 only rests upon axial end 56*a*, which aides in stability. In other examples, brake plate 53 may only rest upon axial end 56*a*.

The out of plane axial ends 55*a*, 56*a* permit brake plate 53 to release at an adjustable current level. The current required to hold brake plate 53 in a brake disengaged position is directly proportional to the offset. When the two planes of axial ends 55*a*, 56*a* are separated by a larger distance, the current required to hold brake plate 53 in a brake disengaged position will be higher as compared to the current required to hold brake plate 53 in the brake disengaged position when the two planes are separated by a smaller distance. This is because the air gap between brake plate 53 and a lower one of axial ends 55*a*, 56*a* creates reluctance to flow of magnetic flux. If the offset between axial ends 55*a*, 56*a* is too small, the hysteresis in brake housing 52 may cause the retention of magnetic flux and hence hold brake plate 53 in the brake disengaged position even when the current applied to electromagnetic brake release is reduced to zero.

Referring again to FIG. 6, rotation of rotor 40 within housing 20 is enabled by first bearing 82 and second bearing 84. First bearing 82 is mounted between first end 42*a* of hub portion 42 of rotor 40 and disk portion 44 of rotor 40. Second bearing 84 is mounted between second end 42*b* of hub portion 42 of rotor 40 and disk portion 44 of rotor 40. An inner diameter of first bearing 82 and an inner diameter of second bearing 84 are larger than an inner diameter of through hole 42*c* of rotor 40. Further, an outer diameter of first bearing 82 and an outer diameter of second bearing 84 are larger than an inner diameter of second cylindrical portion 56 of brake housing 52. Still further, the inner diameter of first bearing 82 and the inner diameter of second bearing 84 are less than the inner diameter of second cylindrical portion 56 of brake housing 52. Base 51 of brake assembly 50 is configured such that second bearing 84 can be installed from the outside of electric motor 10. After second bearing is installed, bearing cover 60 can be attached to base 51, allowing the sizes of brake housing 52 and electromagnetic brake release 54 to be maximized. Otherwise, the inner diameter of second cylindrical portion 56 would need to increase to permit second bearing 84 to pass through during assembly, thereby reducing the size of brake housing 52. Advantageously, increasing the sizes of brake housing 52 and electromagnetic brake release 54 maximizes the magnetic field that is used to retract brake plate 53. This maximized magnetic field, in turn, permits the use of stronger springs 59, which increases the stopping and holding force of brake assembly 50.

As further shown in FIG. 6, when assembled, electric motor 10 is configured such that a line segment AB that is parallel to an axis of rotation R of rotor 40 passes through disk portion 44 of rotor 40, brake assembly 50, first bearing 82, and brake plate 53. In some examples, line segment AB can also pass through a spring 59 housed within a recess 56*b* of second cylinder portion 56 (not shown in FIG. 6). In addition, when assembled, electric motor 10 is configured such that a line segment CD that is perpendicular to the axis of rotation R of rotor 40 passes through through hole 42*c*, brake housing 52, electromagnetic brake release 54, cylindrical portion 46, and stator 30.

In some examples, disk portion 44 of rotor 40 is non-magnetic or mildly magnetic. Making disk portion 44 out of a non-magnetic material can eliminate the coupling between brake assembly 50 and feedback system 70 and can also minimize the current required to retract brake plate 53. This may be counterintuitive to a motor designer as a magnetic material will typically create a shielding effect. However, in electric motor 10, leakage flux that travels within through hole 42*c* of hub portion 42 is attracted to a magnet disk that is part of target 72 on the opposite side of disk portion 44 from brake assembly 50. The extra magnetic field from electromagnetic brake release 54 can interfere with feedback system 70 especially if feedback system 70 works by detecting magnetic field from target 72.

In some examples, it may be desirable for both wires that energize the electric motor and the wires that control electromagnetic brake release 54 to exit electric motor 10 at the same end of housing 20. For instance, it may be desirable for both of these wires to exit electric motor 10 by way of closed first end 24 of housing 20. This can create a design challenge for the wires that control electromagnetic brake release 54, since electromagnetic brake release 54 is on the side of electric motor 10 that is opposite to closed first end 24. It may be desirable to route the wires inside of electric motor 10, to help protect the wires from an outside environment. There may be limited room for such wires to travel through electric motor 10 within the gap between stator 30 and rotor 40. However, slight movement of the wires within that gap could cause the wires to rub rotor 40, leading to failure of brake assembly 50.

Figure 16:
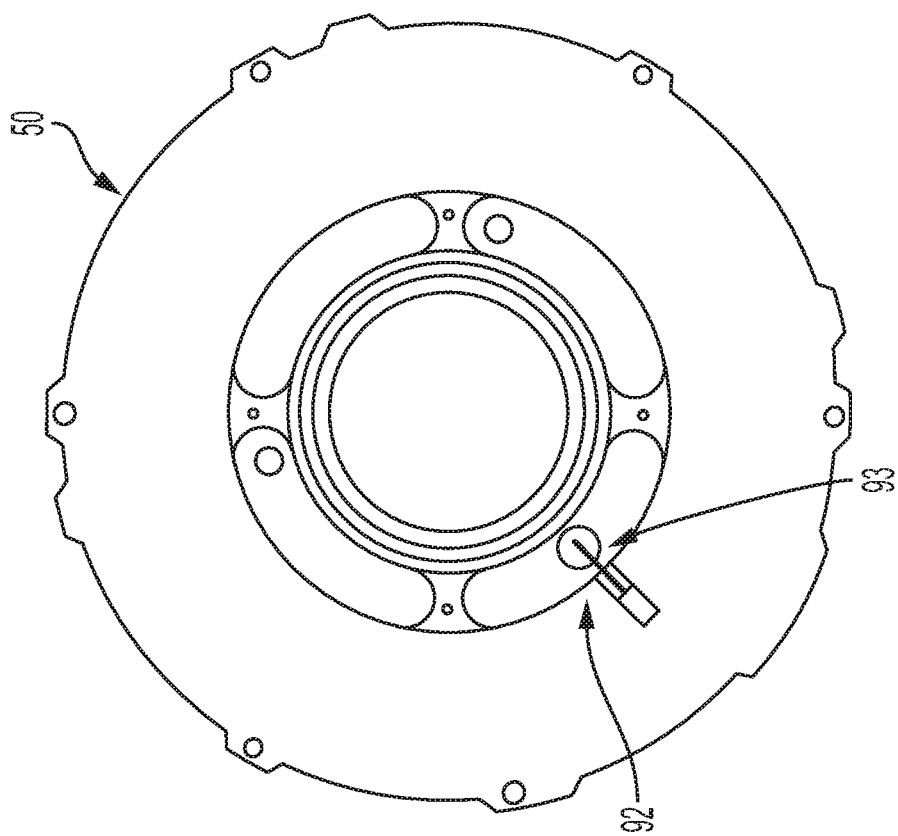
FIG. 16 is an elevation view of the brake assembly of FIG. 15.

Accordingly, as shown in FIGS. 15 and 16, to route the wires that control electromagnetic brake release 54 through electric motor 10 and to closed first end 24 of housing 20, brake assembly 50 includes a brake wire passageway 92 connecting slot 57 with an inner side of base 51. Brake wire passageway 92 is provided at the intersection of first cylindrical portion 55 and base 51. Brake wire passageway 92 permits wires 93 attached to electromagnetic brake release 54 to safely transverse the cavity of electric motor that contains rotating rotor 40, hence eliminating the failure mode in which wires 93 are inadvertently worn by the rotating rotor 40.

Figure 18:
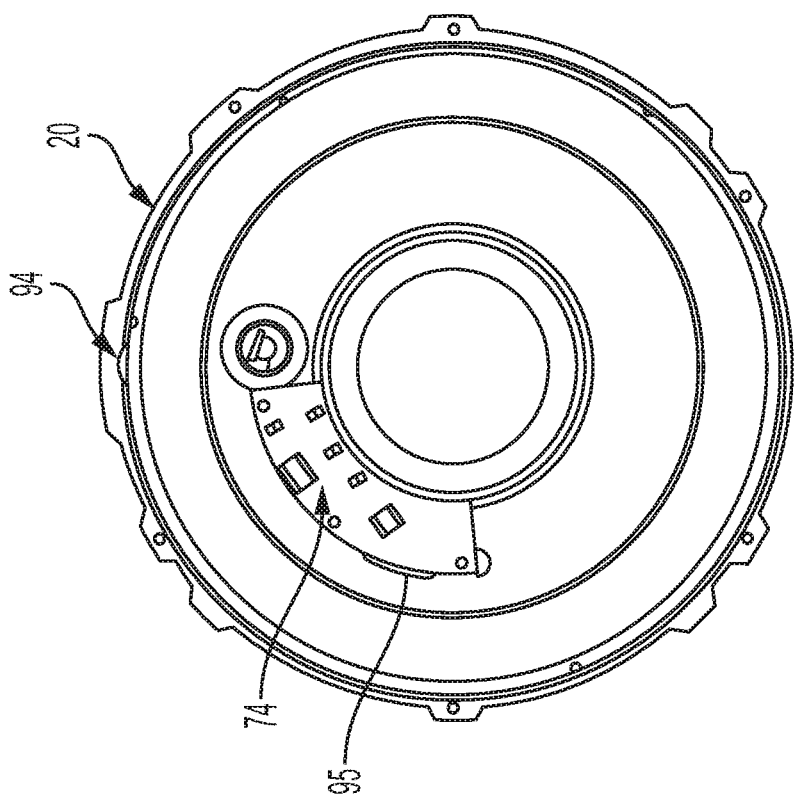
FIG. 18 is a cutaway elevation view of the electric motor of FIG. 4.
Figure 17:
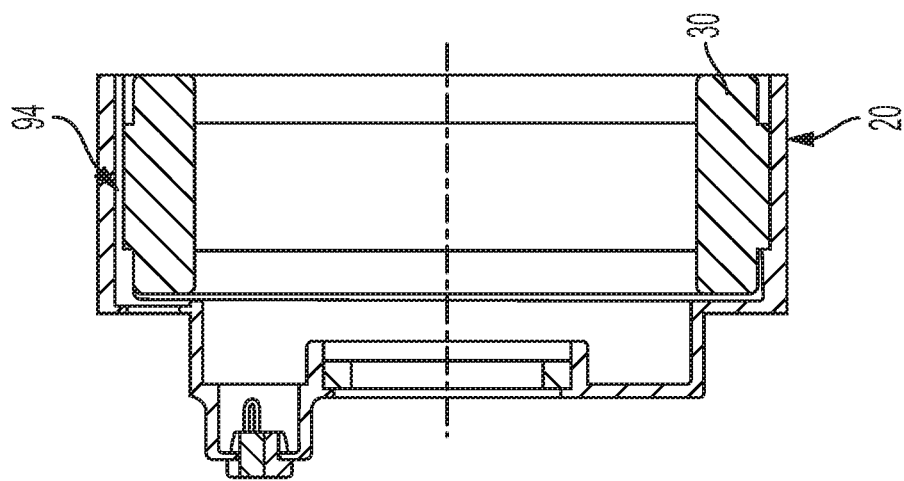
FIG. 17 is a partial cross-sectional view of the electric motor of FIG. 4, shown along line A-A.

After passing from slot 57 to the inner side of base 51 by way of brake wire passageway 92, wires 93 can be routed to closed first end 24 of housing 20 in various ways. As one example, after exiting brake wire passageway 92, wires 93 can travel in a groove 94 cut into the interior surface of cylindrical portion 22 of housing. Groove 94 is shown in FIGS. 17 and 18. With this approach, wires 93 can travel between stator 30 and housing 20. As another example, after exiting brake wire passageway 92, wires 93 can travel through stator 30. For instance, wires 93 can travel through a slot 35 of stator 30 that contains stator wires 33. Slot 35 is shown in FIG. 9.

As noted above, electric motor 10 can include a set screw 90 that is positioned through cylindrical portion 22 of housing 20 and used to engage a notch 34 of stator 30. This permits stator 30 to be aligned with housing 20 in only one orientation. In some examples, as shown in FIG. 18, an inner side of closed first end 24 of housing 20 can include a mounting pad 95 used to mount reader head 74 of feedback system 70 to housing 20. This results in reader head 74 also being aligned with housing 20 in only one orientation. Because both stator 30 and reader head 74 are mounted to housing 20 in only one orientation, a motor controller can properly energize stator 30 without carrying out an electronic alignment procedure. In addition, feedback system 70 can operate without having to carry out an alignment procedure. The use of notch 34 and the mounting pad 95 can therefore reduce production costs and increase reliability.

Figure 19:
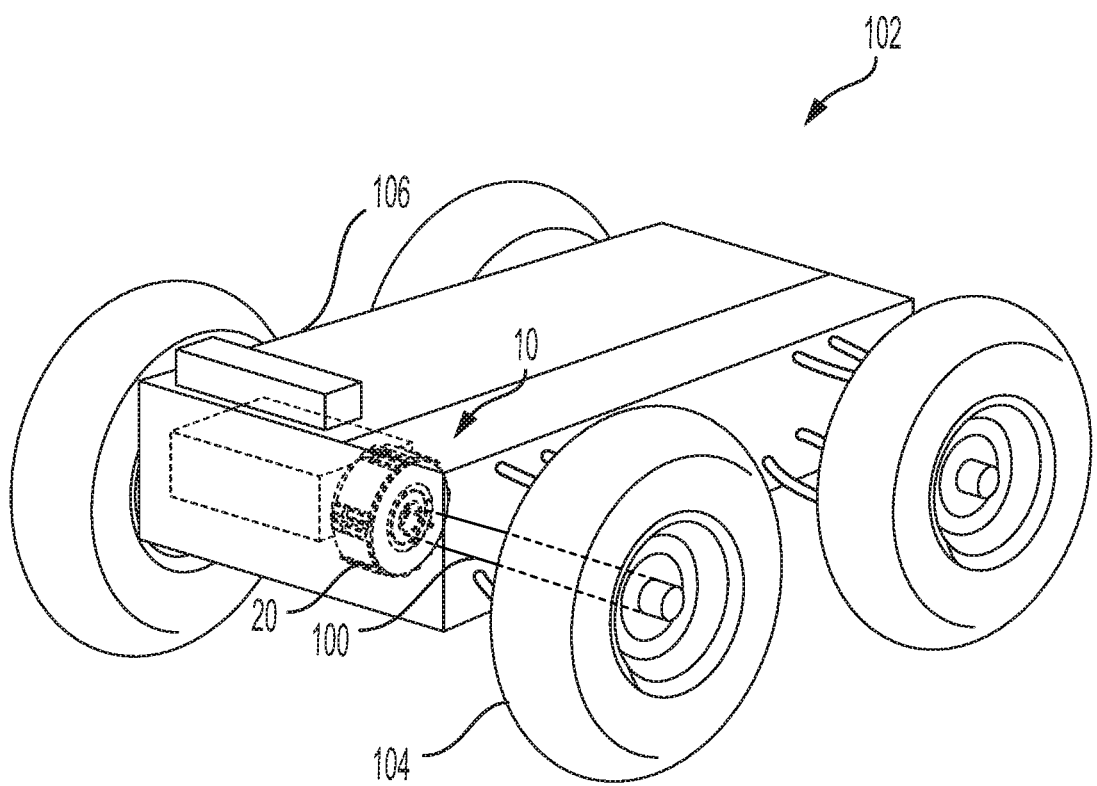
FIG. 19 is a perspective view of a robot, according to an example embodiment.

FIG. 19 shows electric motor 10 coupled to an axle 100 of a robot 102. Axle 100 runs through the center of electric motor 10 and is attached to a tire 104. At least one surface of electric motor 10 is attached to a body 106 of robot 102. For instance, part of housing 20 of electric motor is attached to body 106 of robot 102. In operation, electric motor 10 can rotate axle 100 in one or more directions, hold axle 100 in place, and/or cause axle 100 to stop rotating, thereby controlling movement of robot 102.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. An electric motor comprising:
    a housing;
    a stator fixed relative to the housing;
    a rotor having a hub portion, a cylindrical portion made of a magnetic material, and a disk portion made of a non-magnetic material, wherein the hub portion has a first end, a second end, and a through hole therethrough;
    a brake assembly fixed relative to the housing and configured to selectively prevent rotation of the rotor, wherein the brake assembly comprises (i) a base that is fixedly attached to the housing, (ii) a brake housing having a first cylindrical portion and a second cylindrical portion, the second cylindrical portion of the brake housing being concentrically positioned within the first cylindrical portion of the brake housing, wherein the first cylindrical portion and the second cylindrical portion extend axially from the base, and (iii) a brake plate covering at least a portion of an axial end of the first cylindrical portion of the brake housing and an axial end of the second cylindrical portion of the brake housing;
    a first bearing mounted between the first end of the hub portion of the rotor and the disk portion of the rotor; and
    a second bearing mounted between the second end of the hub portion of the rotor and the disk portion of the rotor.

2. The electric motor of claim 1, wherein the hub portion is made of a non-magnetic material.

3. The electric motor of claim 1, further comprising a plurality of magnets mounted circumferentially about the cylindrical portion of the rotor.

4. The electric motor of claim 1, wherein the brake plate is biased against the disk portion of the rotor by a spring that is positioned in a recess of the first cylindrical portion or a recess of the second cylindrical portion.

5. The electric motor of claim 4, wherein the brake assembly further comprises an electromagnetic brake release at least partially positioned between the first cylindrical portion of the brake housing and the second cylindrical portion of the brake housing, and wherein the electromagnetic brake release is configured to move the brake plate away from the disk portion of the rotor when activated.

6. The electric motor of claim 5, configured such that:
    a line segment AB that is parallel to the axis of rotation of the rotor passes through the disk portion of the rotor, the brake assembly, the first bearing, the spring, and the brake plate, wherein the spring is positioned in the recess of the second cylindrical portion; and
    a line segment CD that is perpendicular to the axis of rotation of the rotor passes through the hub portion of the rotor, the brake housing, the electromagnetic brake release, the cylindrical portion of the rotor, and the stator.

7. The electric motor of claim 4, wherein the brake plate is biased against a knurled pattern on a surface of the disk portion of the rotor.

8. The electric motor of claim 1, wherein an axial end of the first cylindrical portion is axially offset from and parallel to an axial end of the second cylindrical portion.

9. The electric motor of claim 1, wherein the first bearing and the second bearing each have an outer diameter that is greater than an inner diameter of the second cylindrical portion of the brake housing, and wherein the first bearing and the second bearing each have an inner diameter that is less than the inner diameter of the second cylindrical portion of the brake housing.

10. The electric motor of claim 1, wherein the brake assembly further comprises a brake wire passageway passing through the base of the brake assembly, thereby connecting a slot formed between the first cylindrical portion of the brake housing and the second cylindrical portion of the brake housing with an inner side of the base.

11. The electric motor of claim 1, wherein the first bearing and the second bearing each have an inner diameter that is greater than an inner diameter of the through hole of the hub portion of the rotor.

12. The electric motor of claim 1, further comprising a feedback system having a target and a reader head, wherein the reader head is mounted to the housing, and wherein the target is mounted to the disk portion of the rotor with fasteners that are mounted asymmetrically about the disk portion of the rotor.

13. An electric motor comprising:
    a housing;
    a stator fixed relative to the housing;
    a rotor having a hub portion, a cylindrical portion, and a disk portion, wherein the hub portion has a first end, a second end, and a through hole therethrough;
    a brake assembly fixed relative to the housing, the brake assembly having a cylindrical portion and being configured to selectively prevent rotation of the rotor;

a first bearing mounted between the first end of the hub portion of the rotor and the disk portion of the rotor; and a second bearing mounted between the second end of the hub portion of the rotor and the disk portion of the rotor, wherein the first bearing and the second bearing each have an outer diameter that is greater than an inner diameter of the cylindrical portion of the brake assembly, and wherein the first bearing and the second bearing each have an inner diameter that is less than the inner diameter of the cylindrical portion of the brake assembly.

14. The electric motor of claim 13, wherein the inner diameter of the first bearing and the inner diameter of the second bearing are greater than an inner diameter of the through hole of the hub portion of the rotor.

15. The electric motor of claim 13, further comprising a feedback system having a target and a reader head, wherein the reader head is mounted to the housing, and wherein the target is mounted to the disk portion of the rotor with fasteners that are mounted asymmetrically about the disk portion of the rotor.

16. An electric motor comprising:
a housing;
a stator fixed relative to the housing;
a rotor having a hub portion, a cylindrical portion, and a disk portion, wherein the hub portion has a first end, a second end, and a through hole therethrough; and
a brake assembly fixed relative to the housing and configured to selectively prevent rotation of the rotor,
wherein the brake assembly comprises a brake housing and a base, the brake housing having a first cylindrical portion extending axially from the base and a second cylindrical portion extending axially from the base, the second cylindrical portion of the brake housing concentrically positioned within the first cylindrical portion of the brake housing, and
wherein an axial end of the first cylindrical portion is axially offset from and parallel to an axial end of the second cylindrical portion.

17. The electric motor of claim 16, wherein the brake assembly further comprises a brake plate covering at least a portion of an axial end of the first cylindrical portion of the brake housing and an axial end of the second cylindrical portion of the brake housing.

18. The electric motor of claim 17, wherein:
the brake plate is biased against the disk portion of the rotor by a spring that is positioned in a recess of the first cylindrical portion or a recess of the second cylindrical portion, and wherein the brake assembly further comprises an electromagnetic brake release at least partially positioned between the first cylindrical portion of the brake housing and the second cylindrical portion of the brake housing, and
the electromagnetic brake release is configured to move the brake plate away from the disk portion of the rotor when activated.

* * * * *